United States Patent
Lee et al.

(10) Patent No.: US 11,582,116 B2
(45) Date of Patent: Feb. 14, 2023

(54) METHOD AND APPARATUS FOR COLLECTING NETWORK DATA

(71) Applicant: ELECTRONICS AND TELECOMMUNICATIONS RESEARCH INSTITUTE, Daejeon (KR)

(72) Inventors: Soohwan Lee, Daejeon (KR); Myung Ki Shin, Seoul (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/143,360

(22) Filed: Jan. 7, 2021

(65) Prior Publication Data

US 2021/0226860 A1    Jul. 22, 2021

(30) Foreign Application Priority Data

Jan. 7, 2020   (KR) .................. 10-2020-0002255
May 22, 2020   (KR) .................. 10-2020-0061871
(Continued)

(51) Int. Cl.
    *H04L 41/50*   (2022.01)
    *H04L 43/0823* (2022.01)
    (Continued)

(52) U.S. Cl.
    CPC ...... *H04L 41/5032* (2013.01); *H04L 12/1407* (2013.01); *H04L 41/14* (2013.01);
    (Continued)

(58) Field of Classification Search
    CPC .............. H04L 41/5032; H04L 41/147; H04L 41/5009; H04L 43/0823; H04L 12/1407;
    (Continued)

(56) References Cited

U.S. PATENT DOCUMENTS 8,181,195 B2    5/2012  Sardera
8,260,752 B1 *  9/2012  Stringham .......... G06F 11/1451
                                                 707/649
(Continued)

FOREIGN PATENT DOCUMENTS

KR   10-2018-0107000 A   10/2018

OTHER PUBLICATIONS

ETRI, "TR 23.700-91: Solution for KI #11", SA WG2 Meeting #136 AH S2-2000740, Jan. 13-17, 2020, Incheon, South Korea.
(Continued)

*Primary Examiner* — Gil H. Lee
*Assistant Examiner* — Chhian (Amy) Ling
(74) *Attorney, Agent, or Firm* — LRK Patent Law Firm

(57) ABSTRACT

Disclosed herein are a method and an NWDAF for collecting network data, including: transmitting a network exposure subscription request message including an event reporting granularity parameter to the NF; receiving a data set determined by the NF based on the event reporting granularity parameter from the NF through an event exposure notification message in at least one reporting cycle; and performing network data analysis using received data set.

19 Claims, 3 Drawing Sheets

(30) Foreign Application Priority Data

| Jun. 5, 2020 | (KR) | 10-2020-0068078 |
|---|---|---|
| Aug. 13, 2020 | (KR) | 10-2020-0101664 |
| Jan. 7, 2021 | (KR) | 10-2021-0002133 |

(51) Int. Cl.

| H04L 41/147 | (2022.01) |
|---|---|
| H04L 41/5009 | (2022.01) |
| H04W 8/02 | (2009.01) |
| H04W 24/08 | (2009.01) |
| H04W 24/04 | (2009.01) |
| H04W 28/02 | (2009.01) |
| H04W 24/02 | (2009.01) |
| H04L 12/14 | (2006.01) |
| H04L 41/14 | (2022.01) |
| H04M 15/00 | (2006.01) |
| H04W 24/10 | (2009.01) |

(52) U.S. Cl.
CPC ........ *H04L 41/147* (2013.01); *H04L 41/5009* (2013.01); *H04L 43/0823* (2013.01); *H04M 15/58* (2013.01); *H04M 15/66* (2013.01); *H04M 15/8016* (2013.01); *H04M 15/83* (2013.01); *H04M 15/85* (2013.01); *H04W 8/02* (2013.01); *H04W 24/02* (2013.01); *H04W 24/04* (2013.01); *H04W 24/08* (2013.01); *H04W 24/10* (2013.01); *H04W 28/0268* (2013.01)

(58) Field of Classification Search
CPC ........ H04L 41/14; H04W 8/02; H04W 24/04; H04W 28/0268; H04W 24/08; H04W 24/10; H04W 24/02; H04M 15/83; H04M 15/85; H04M 15/8016; H04M 15/58; H04M 15/66

See application file for complete search history.

(56) References Cited

U.S. PATENT DOCUMENTS

| 2015/0093996 | A1* | 4/2015 | Ghaboosi | H04W 24/02 455/67.11 |
|---|---|---|---|---|
| 2018/0218269 | A1* | 8/2018 | Oliner | G06F 16/26 |
| 2018/0262924 | A1* | 9/2018 | Dao | H04W 72/1257 |
| 2018/0359638 | A1* | 12/2018 | Konji | H04W 8/005 |
| 2019/0050578 | A1 | 2/2019 | Choi | |
| 2019/0155922 | A1 | 5/2019 | Kim et al. | |
| 2020/0112907 | A1* | 4/2020 | Dao | H04M 15/83 |
| 2020/0128552 | A1 | 4/2020 | Son et al. | |
| 2020/0186622 | A1 | 6/2020 | Kim et al. | |
| 2020/0196169 | A1 | 6/2020 | Dao et al. | |
| 2020/0228420 | A1* | 7/2020 | Dao | H04L 67/1097 |
| 2021/0014141 | A1* | 1/2021 | Patil | H04W 24/02 |
| 2021/0274575 | A1* | 9/2021 | Talebi Fard | H04W 76/12 |
| 2021/0352465 | A1* | 11/2021 | Lee | H04W 4/40 |
| 2021/0377203 | A1* | 12/2021 | Hou | G08B 31/00 |
| 2022/0039046 | A1* | 2/2022 | Ianev | H04W 60/00 |

OTHER PUBLICATIONS

ETRI, "KI#11 and #18, New Sol: Enhancement on network exposure to allow data approximation", SA WG2 Meeting #139E S2-2003941, Jun. 1-12, 2020, Elbonia.

ETRI, "KI#11 and #18, New Sol: Enhancement on network exposure to allow data approximation", SA WG2 Meeting #139E S2-2004553, Jun. 1-12, 2020, Elbonia.

ETRI, "KI#11 and #18, Sol#38: update to remove ENs with further clarifications", SA WG2 Meeting #140E S2-2005374, Aug. 19-Sep. 1, 2020, Elbonia.

* cited by examiner ed(5G/9,116 B2

METHOD AND APPARATUS FOR COLLECTING NETWORK DATA

CROSS-REFERENCE TO RELATED APPLICATIONS

This application claims priority to and the benefit of Korean Patent Applications Nos. 10-2020-0002255, 10-2020-0061871, 10-2020-0068078, 10-2020-0101664, and 10-2021-0002133 filed in the Korean Intellectual Property Office on Jan. 7, 2020, May 22, 2020, Jun. 5, 2020, Aug. 13, 2020, and Jan. 7, 2021, the entire contents of which are incorporated herein by reference.

BACKGROUND OF THE INVENTION

1. Field of the Invention

This description relates to a method and apparatus for collecting network data through approximation.

2. Description of Related Art

The network data analytics function (NWDAF) of the 5G mobile communication system collects raw data of each network function and application function to convert the raw data into big data, and processes big data to generate network analytics information in order to provide the network analytics information to the network function and the application function. However, too much raw data has been collected in the network function and the application function of the mobile communication system, and a frequency of occurrence of the raw data is too high, so the load generated by the data collection is practically very large.

SUMMARY OF THE INVENTION

An embodiment provides a method for collecting network data by an NWDAF.

Yet another embodiment provides an NWDAF collecting network data.

According to an embodiment, a method for collecting network data from a network function (NF) by a network data analytics function (NWDAF) is provided. The method includes: transmitting a network exposure subscription request message including an event reporting granularity parameter to the NF; receiving a data set determined by the NF based on the event reporting granularity parameter from the NF through an event exposure notification message in at least one reporting cycle; and performing network data analysis using received data set.

The network exposure request message may further include a reporting type parameter, and the data set may be determined by the NF based on the event reporting granularity parameter and the reporting type parameter.

The receiving a data set determined by the NF based on the event reporting granularity parameter from the NF through an event exposure notification message in at least one reporting cycle may include receiving, from the NF, a data set including at least one of newly added data, deleted data, changed data, or data that is not described by the event reporting granularity parameter when the reporting type instructs the NF to report the data set representing differences from the previous notification, wherein the data set is determined by a comparison with data in a previous notification.

The performing network data analysis using received data set may include reassembling the data in the previous notification with the data set.

The method may further include inferring data corresponding to a next reporting cycle from a data set received in the at least one reporting cycle based on the event reporting granularity parameter when the event exposure notification message is not received from the NF in the next reporting cycle of the at least one reporting cycle after the data set is received from the NF at the at least one reporting cycle.

The event reporting granularity parameter may be applied to one event specific parameter, and the data set may include a plurality of event specific parameters.

The event reporting granularity parameter may be a parameter representing a maximum allowable error for the network data.

wherein the event reporting granularity parameter may indicate a range of data that the NF can ignore when collecting the network data.

The event reporting granularity parameter may indicate a previous notification or an identifier list when the network data to be collected by the NF is represented by an identifier.

The event reporting granularity parameter may indicate a range of changes in the network data when the network data to be collected by the NF is represented by numbers.

According to another embodiment, a network data analytics function (network data analytics function, NWDAF) is provided. The NWDAF includes a processor, a memory, and a communication unit, where the processor coupled to the communication unit executes a program stored in the memory to perform: transmitting a network exposure subscription request message including an event reporting granularity parameter and a reporting type parameter to a network function (NF); receiving a data set determined by the NF based on the event reporting granularity parameter and the reporting type parameter from the NF through an event exposure notification message in at least one reporting cycle; and analyzing network data by using received data set.

When receiving a data set determined by the NF based on the event reporting granularity parameter and the reporting type parameter from the NF through an event exposure notification message in at least one reporting cycle, the processor may perform receiving, from the NF, a data set including at least one of newly added data, deleted data, changed data, or data that is not described by the event reporting granularity parameter when the reporting type instructs the NF to report the data set representing differences from the previous notification, wherein the data set is determined by a comparison with data in a previous notification.

When performing network data analysis by using received data set, the processor may perform reassembling the data in the previous notification with the data set.

The processor may execute the program to further perform: inferring data corresponding to a next reporting cycle from a data set received in the at least one reporting cycle based on the event reporting granularity parameter when the event exposure notification message is not received from the NF in the next reporting cycle of the at least one reporting cycle after the data set is received from the NF at the at least one reporting cycle.

The event reporting granularity parameter may be applied to one event specific parameter, and the data set includes a plurality of event specific parameters.

The event reporting granularity parameter may be a parameter indicating a maximum allowable error for the network data.

The event reporting granularity parameter may indicate a range of data that the NF can ignore when collecting the network data.

The event reporting granularity parameter may indicate a previous notification or an identifier list when the network data to be collected by the NF is represented by an identifier.

wherein the event reporting granularity parameter may indicate a range of changes of the network data when the network data to be collected by the NF is represented by numbers.

According to yet another embodiment, a network function (network function, NF) is provided. The network function includes a processor, a memory, and a communication unit, where the processor coupled to the communication unit executes a program stored in the memory to perform: receiving a network exposure subscription request message including an event reporting granularity parameter and a reporting type parameter from a network data analytics function (NWDAF); transmitting a data set determined based on the event reporting granularity parameter and the reporting type parameter to the NWDAF in at least one reporting cycle through an event exposure notification message; and receiving an analysis result of the data set generated by the NWDAF from the NWDAF.

DETAILED DESCRIPTION OF THE EMBODIMENTS

Figure 1:
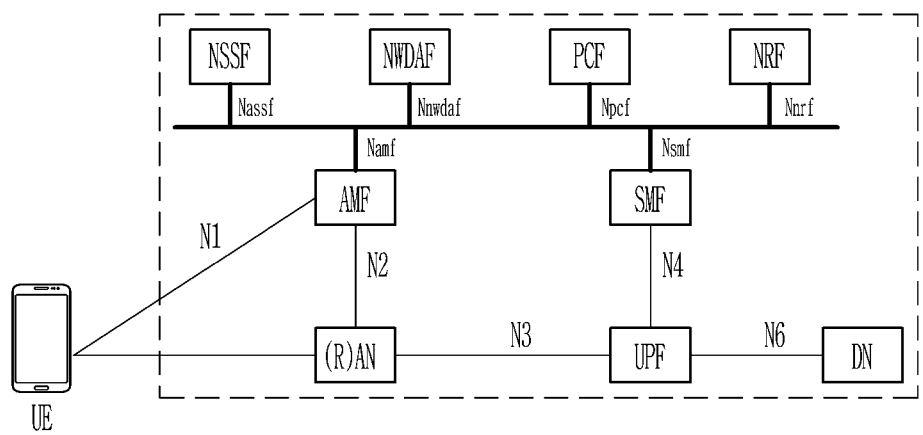
FIG. 1 is a schematic view illustrating a topology of a mobile communication system according to an embodiment.

In the following detailed description, only certain embodiments of the present invention have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

Throughout the specification, a user equipment (UE) may be called a terminal, mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

FIG. 1 is a schematic view illustrating a topology of a mobile communication system according to an embodiment.

Referring to FIG. 1, a core network of a mobile communication system according to an embodiment includes a plurality of network functions (NFs), and may connect a data network (DN) and a user equipment (UE).

An (Radio) access network ((R)AN) may represent a base station providing a 3GPP access and another base station or an access point (AP) providing a non-3GPP access such as Wi-Fi. The (R)AN may be connected to an access and mobility function (AMF) through an N2 interface, and may be connected to a user plane function (UPF) through an N3 interface.

The AMF may be responsible for the mobility management function for the UE. The AMF may provide the access and mobility management function independently for the access technology, that is, may provide the access and mobility management function by the terminal unit. Therefore, each terminal may basically be connected to one AMF.

A session management function (SMF) may perform a function for managing a session to the UE. When multiple sessions are maintained for the terminal, different SMFs may be assigned for each session.

The policy control function (PCF) may determine policies such as the session management and the mobility management based on packet flow information received to ensure QoS (Quality of Service, QoS) from application function (Application function, AF). The policy determined by the PCF may be transmitted to the AMF, the SMF, and the like, and then, the functions such as the mobility management, the session management, the QoS management may be performed in each NF.

The DN may transfer a protocol data unit (PDU) to be transmitted to the UE to the UPF or may receive a PDU transmitted from the terminal through the UPF. The UPF and the DN may be connected through the N6 interface.

The UPF may be established using control signal information generated by the SMF, and the UPF may report its status to the SMF through the N4 interface.

The terminal and AMF may be connected through N1 interface.

Authentication server function (AUSF) may store data for authentication of the terminal.

By collecting and analyzing various network data, NWDAF may help in optimizing the operation of the network functions in the core network such as the AMF, the SMF, and the PCF. The NWDAF may provide various analytics information required for optimizing the operation of the network functions by analyzing data, events, and status information collected from various network functions in the core network. Therefore, each network function may optimize its own operation by utilizing various analytics information provided by the NWDAF.

Figure 2:
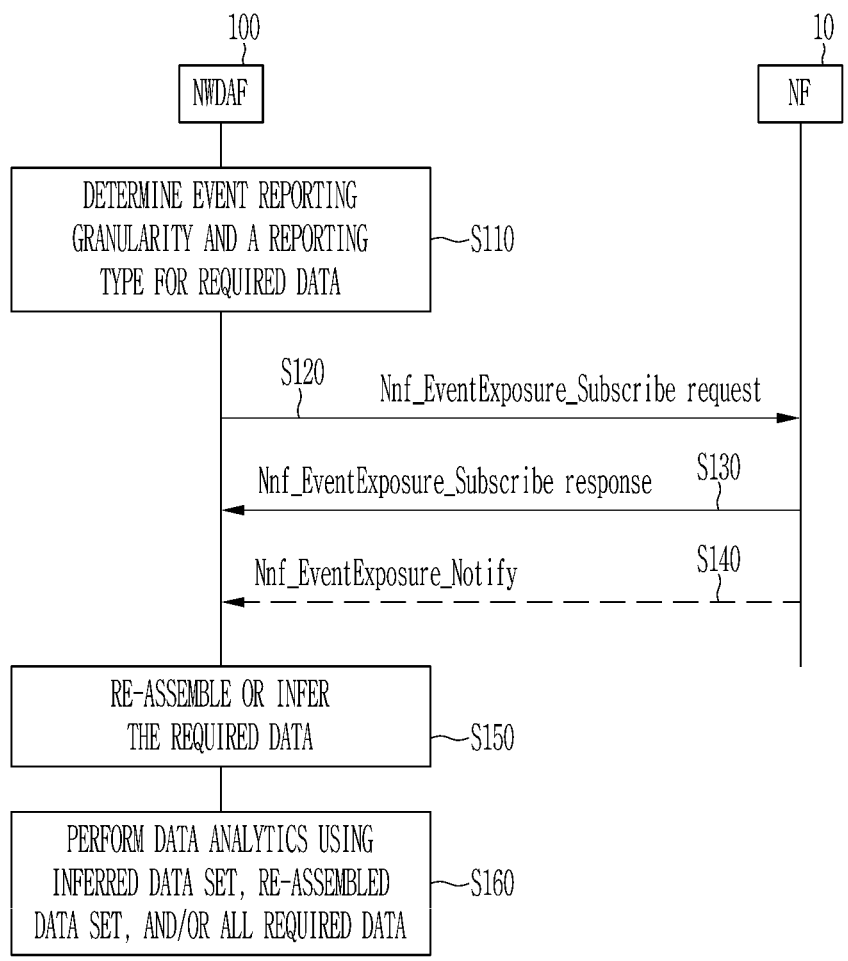
FIG. 2 is a flowchart illustrating a method of collecting network data from a network function by the NWDAF according to an embodiment.

FIG. 2 is a flowchart illustrating a method of collecting network data from a network function by the NWDAF according to an embodiment.

FIG. 2 may show a data collection method of the NWDAF, which may improve data collection efficiency and support real-time data collection for the NWDAF.

Referring to FIG. 2, the NWDAF 100 may determine event reporting granularity and a reporting type (or reporting value flag) for data required for analysis (S110).

The NWDAF 100 according to an embodiment may determine a maximum allowable error for to the required data, and may set an event reporting granularity based on the determined maximum allowable error. The maximum allowable error determined by NWDAF 100 may be a range of data that can be ignored by the NF which reports the required data based on the event reporting granularity. In addition, the NWDAF 100 according to the embodiment may determine a reporting type to reduce the number of events to be collected and signaling overhead of the core network and each network function.

The NWDAF 100 according to the embodiment may utilize a network exposure service provided by each network function (network function, NF) to increase efficiency of data collection and enable real-time (or almost real-time) data collection. A request message transmitted by the NWDAF 100 to the NF 10 for subscription of the network exposure service may include a parameter (event reporting granularity) about negligible errors regarding the required data in the notification of each NF. In addition, the request message may include a parameter (reporting type) for requesting only data that has not been reported in a previous notification as the required data.

Specifically, the NWDAF 100 according to the embodiment may determine the event reporting granularity and the reporting type as event reporting information for an operation of the event exposure subscription. Table 1 below shows the event reporting granularity and the reporting type determined by the NWDAF 100 according to the embodiment.

TABLE 1

| event reporting information parameter | description |
| --- | --- |
| event reporting granularity | indicate the maximum allowable error of the required data during each event reporting cycle |
| reporting type | indicate the type of the notification (either instructing to report only a data set |

TABLE 1-continued

| event reporting information parameter | description |
| --- | --- |
| | representing differences from previous notifications or instructing to report all required data during each reporting cycle) |

When the event reporting granularity parameter is set by a consumer NF (e.g., the NWDAF) in the event exposure subscription procedure, a producer NF who has received the event exposure subscription request (Nnf_EventExposure_Subscribe request) message including the event reporting granularity parameter may transmit a notification including data requested by the consumer NF.

The producer NF may transmit the notification message including the requested data to the consumer NF at periodic or aperiodic reporting cycle during the event exposure subscription.

The producer NF may not transmit the requested data as a second notification message if a change in data requested during from the first notification to the second notification transmitted to the consumer NF is included within the range determined by the event reporting granularity. The producer NF may determine whether the change of the data requested during one reporting cycle is included within the data range determined by the event reporting granularity. For example, when the change of the requested data is less than the data range predetermined by the event reporting granularity or the requested data is included in a data set of the previous notification (e.g., the requested data ⊂ the data set of the previous notification), the producer NF may not transmit the requested data to the consumer NF despite the event exposure subscription.

If the NWDAF does not receive a notification message including the required data during the reporting cycle, the NWDAF may infer data during the current reporting cycle from the data in the notification message received in the previous reporting cycle based on the event reporting granularity. For example, NWDAF may infer the data corresponding to the current reporting cycle by adding Gaussian noise (e.g., Gaussian noise with an average of 0 (zero-mean Gaussian noise)) to the data included in the previous notification. Through this, the NWDAF may acquire the entire record of required data corresponding to all reporting cycles during the subscription period, and a notification (or provisioning) frequency of the required data can be greatly reduced.

The reporting type parameter may be set to use a data set which differs from the previous notification, or may be set to use all required data.

When the reporting type parameter is set to use a data set different from the previous notification, the producer NF may transmit, to the consumer NF through a notification message, the data set including newly added data, deleted data, changed data, or data that is not described by the event reporting granularity, where the data set is determined by comparing with the previous notification.

When the reporting type parameter is set to use all required data, the producer NF may send a notification including the entire set of requested data to the consumer NF in each reporting cycle of event notification.

When the reporting type parameter is set so that the NWDAF 100 uses a data set representing the difference from the previous notification, the NWDAF 100 may receive, from the producer NF, a notification including the newly added data, the deleted data, the changed data, or the data that is not described in the event reporting granularity. In this case, the NWDAF 100 may re-assemble data in the previous notification and data in a notification subsequent to the previous notification. Therefore, the reporting type parameter can reduce data capacity in each notification without a loss of the required data.

Referring to FIG. 2, the NWDAF 100 according to the embodiment may request a subscription for data collection of the NF 10 to the NF 10 by invoking an event exposure subscription request message (Nnf_EventExposure_Subscribe request) which includes the event reporting granularity and the reporting type as parameters (S120). The required data may be indicated by an event ID, an event filter (e.g., local information), and a type of an event reporting (e.g., for all UEs, UEs within a specific group, or specific UEs) which are included in the event exposure subscription request message The NF 10 may be one of several network functions in a mobile communication system. Thereafter, the NF 10 may transfer an event exposure subscription response message (Nnf_EventExposure_Subscribe response) to the NWDAF 100, so that the event exposure subscription of the NWDAF 100 may be determined (S130). The event reporting granularity parameter and the reporting type parameter transferred to the NF 10 by the event exposure subscription request message may be maintained during the event exposure subscription of the NWDAF 100, and the duration of the event exposure subscription may include a plurality of periodic or aperiodic reporting cycles in which the notification message is transmitted to the NWDAF 100. In addition, the event reporting granularity parameter and the reporting type parameter may be updated by re-invoking the event exposure subscription message (Nnf_EventExposure_Subscribe).

The NF 10 according to the embodiment may transmit data requested through a first notification to the NWDAF 100 after the event exposure subscription initiates. Thereafter, the NF 10 may determine whether to transmit the requested data to the NWDAF 100 through an event exposure notification message (Nnf_EventExposure_Notify) based on the event reporting granularity at every reporting cycle (S140).

For example, when the change of the requested data between the previous reporting cycle and the next reporting cycle is within the range determined by the event reporting granularity, the NF 10 may not transmit the event exposure notification message to the NWDAF 100 in the next reporting cycle. Alternatively, when the change of the requested data is greater than the range determined by the event reporting granularity, the NF 10 may transmit the event exposure notification message to the NWDAF 100 in the next reporting cycle.

The NF 10 according to the embodiment may transmit all requested data or may transmit a data set different from the data set of the previous notification according to the reporting type parameter when transmitting the event exposure notification message to the NWDAF 100 in the reporting cycle. For example, when the reporting type parameter instructs to report the difference from the previous notification, the NF 10 may transmit, to the NWDAF 100, the event exposure notification message including newly added data, or deleted data, or changed data, or data that is not described by the event reporting granularity. Alternatively, when the reporting type parameter instructs to report all requested data, the NF 10 may transmit all requested data during the reporting cycle to the NWDAF 100 through the event exposure notification message.

The first notification (e.g., first event exposure notification message) transmitted to the NWDAF 100 by the NF 10 may include all requested data regardless of the reporting type.

Referring to FIG. 2, when the NWDAF 100 does not receive the event exposure notification message from the NF 10 in a next reporting cycle of the reporting cycle in which a data set has been received, the NWDAF 100 may infer data corresponding to the next reporting cycle from the data set in the previous notification based on the event reporting granularity. That is, even if there is no notification message or data set received in the next reporting cycle, the NWDAF 100 may infer the data corresponding to the next reporting cycle from the data set received in the previous reporting cycle based on the event reporting granularity.

When the NWDAF 100 receives the event exposure notification message from the NF 10 at the end of the reporting cycle, and the event exposure notification message contains a data set representing the difference from the previous notification, the NWDAF 100 may re-assemble the required data and the data set in the previous notification (S150). After that, the NWDAF 100 may perform network data analytics using the inferred data set, the re-assembled data set, and/or all required data sets (S160).

If the event ID of the event exposure subscription supports the collection of multiple data type from the NF (i.e., when the collection of a plurality of types of data is indicated by the event ID), the NWDAF 100 may set the event reporting granularity for each data. Different types of event reporting granularity may be applied to different types of data that is to be collected. Table 2 below shows examples of each type of data and examples of event reporting granularity that can be applied to each type of data.

TABLE 2

| Data type | Examples of data | Example of event reporting granularity |
|---|---|---|
| Data represented by identifier (identification) | application ID, filter information, location of an application (e.g., list of DNAI), UE ID(s) (e.g., SUPI, GPSI), UE group ID, DNN, S-NSSAI, QFI, TAC, UE location, Exception ID, Exception trend | i) previous notification or ii) List of identifiers (e.g., list of TA(s), etc.) |
| Data represented by numbers | service experience, QoS flow bit rate, QoS flow packet delay, packet transmission, packet retransmission, traffic use report, number of UEs, frequent mobility registration update, UL data rate, DL data rate, traffic volume, exception level | iii) range of change: a range of allowable changes x and y to data requested in a previous notification (e.g., [−x, y]) |

In Table 2, i) When the previous notification is applied as the event reporting granularity, the producer NF may transmit the notification message only when the requested data differs from the data of the previous notification. For example, when the NWDAF collects the UE ID through the subscription of the Nnf_EventExposure service, the producer NF may compare collected data with the data in the previous notification and may invoke Nnf_EventExposure_Notify message when a new UE ID is added to the data in the previous notification or an existing UE ID has disappeared from the data in the previous notification.

ii) When a list of identifiers is applied as the event reporting granularity, the producer NF may send the Nnf_EventExposure_Notify message to the consumer NF when a change of the requested data (e.g., identifier or ID) is not included in 'the list of identifiers'. For example, when the NWDAF collects the UE location through the subscription of the Nnf_EventExposure service and the event reporting granularity is set to a predetermined TA list, the producer NF may invoke Nnf_EventExposure_Notify message when the UE location is changed to a TA that does not belong to the TA list of the event reporting granularity.

iii) When a range of change is applied as the event reporting granularity, the producer NF may send the Nnf_EventExposure_Notify message to the consumer NF when the requested data is out of the range ([data-x in previous notification), (data y in previous notification]). For example, when the NWDAF collects the number of UEs in a specific area from the AMF, and the event reporting granularity is set to (x=10, y=11), the AMF may not invoke the Nnf_EventExposure_Notify message when the number of UEs in the specific area is within the range of [−10, 11) for the data in the previous notification. Thereafter, the NWDAF may determine data corresponding to the event reporting cycle in the range of [previous data−10, previous data+11) through inference.

When the 'reporting type' is set to use a data set that differs from the previous notification, the producer NF may compare collected data with the previous notification and may report, to the consumer NF at the event notification cycle, a data set including newly added data, or deleted data, or changed data, or data that is not described in the event reporting granularity. When the 'reporting type' is set to all required data, producer NF may report all data requested during the subscription in every event notification cycle.

The event reporting granularity parameter and the reporting type parameter in the Nnf_EventExposure_Subscribe message may be applied to one event specific parameter. A data set including a plurality of event specific parameters (i.e., a data set configured by the plurality of event specific parameters) may be transferred to the NWDAF 100 through an Nnf_EventExpsoure_Notify message.

When the event reporting granularity is set, an invoking condition for the Nnf_EventExpsoure_Notify is as follows.

Event ID supports single data collection: The Producer NF may invoke the Nnf_EventExposure_Notify when a change of data is out of the data range of the event reporting granularity.

Event ID supports multiple data collection (e.g., service data collected from AF):

When the event reporting granularity is set only for specific data, the producer NF may invoke the Nnf_EventExposure_Notify when a change of the specific data is out of the data range of the event reporting granularity.

When the event reporting granularity is set for different types of data, the producer NF may invoke the Nnf_EventExposure_Notify when at least one change of the data is out of the data range of the event reporting granularity.

For example, when the NWDAF collects a data set of the SUPI and the UE location for a specific UE group from the AMF (Event ID=Location Report) and the event reporting granularity is set as "previous notification" for the SUPI and the UE location, respectively, the producer NF may invoke the Nnf_EventExposure_Notify when at least one UE location is changed from the UE location of the previous notification or the target SUPI is changed due to UE mobility (e.g., a new UE moves into an area or an existing UE moves out of the area).

When the 'reporting type' is set in the Nnf_EventExposure_Subscribe procedure, event specific parameters which may be transferred to the NWDAF 100 by the Nnf_EventExpsoure_Notify may include following contents.

When the 'reporting type' is set to use a data set representing differences from previous notifications, If the event reporting granularity is not applied to the subscription, the event specific parameters may include i) newly added data, ii) deleted data, and iii) changed data compared to the previous notification. If the same data is included in the notification compared to the previous notification, the NWDAF may recognize that the data is ii) deleted from the previous notification, and if data that is not identical compared to the previous notification is included in the notification, the NWDAF may recognize the data in the notification as i) newly added data or iii) changed data.

When the event reporting granularity is applied to the subscription, the event specific parameters may include data of which change is not described in the event reporting granularity. If the same data is included in the notification compared to the previous notification, the NWDAF may recognize that the data in the notification is ii) deleted from the previous notification, and if the data that is not identical compared to the previous notification is included in the notification, the NWDAF may recognize the data in the notification as i) newly added data or iii) changed data.

When the 'reporting type' is set to use all required data, the event specific parameters may include all required data.

As described above, the NWDAF 100 can improve the conventional Nnf_EventExposure_Subscribe procedure and the Nnf_EventExposure_Notify service procedure by using the event reporting granularity parameter and the reporting type parameter.

The NWDAF 100 according to an embodiment can determine the appropriate event reporting granularity for the data required to generate analytics, and can infer the required data during the subscription period from the differences conditionally reported on the previous notification. In addition, all NF 10s in the mobile communication system that exposes events, when there is a change of data outside the predetermined range of the event reporting granularity (i.e., data change that is not described by the event reporting granularity) during an event reporting cycle, network data requested in a view of the difference from the previous notification may be provided to the NWDAF 100.

As described above, when the NWDAF collects network data based the event reporting granularity and the reporting type, an efficiency of the data collection can be improved and real-time data collection can be improved.

Figure 3:
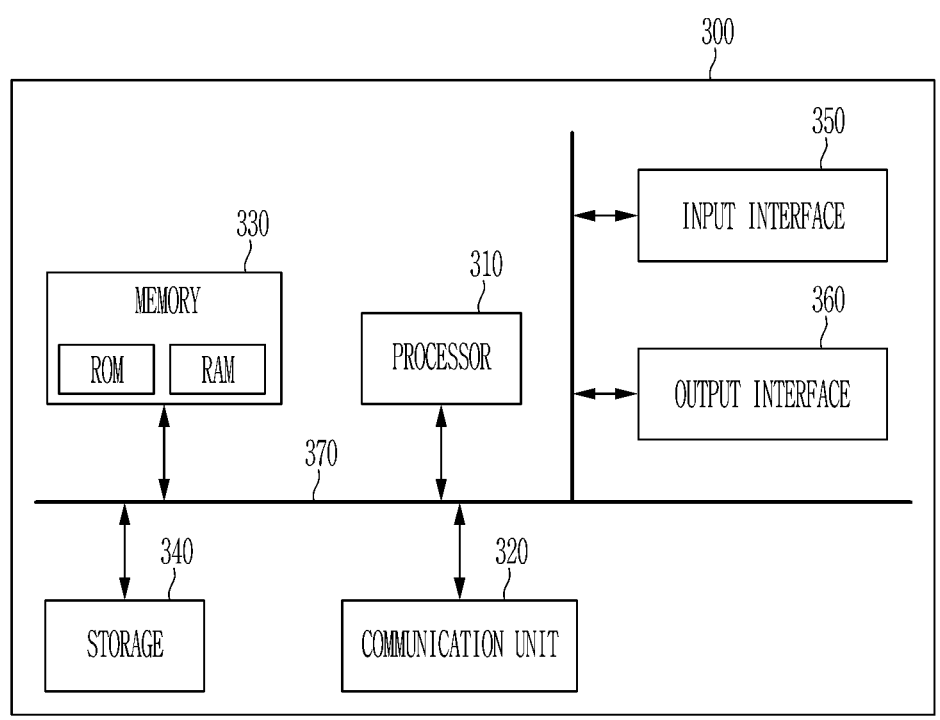
FIG. 3 is a block diagram illustrating a network function (NF) device according to another embodiment.

FIG. 3 is a block diagram illustrating a network function (NF) device according to another embodiment.

The NF device according to another embodiment may be one of NFs in a mobile communication system and may be implemented as a computer system, for example, a computer-readable medium. Referring to FIG. 3, the computer system 300 may include at least one of a processor 310, a memory 330, an input interface device 350, an output interface device 360, and a storage device 340 communicating through a bus 370. The computer system 300 may also include a communication device 320 coupled to the network. The processor 310 may be a central processing unit (CPU) or a semiconductor device that executes instructions stored in the memory 330 or the storage device 340. The memory 330 and the storage device 340 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 320 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A method for collecting network data from a network function (NF) in a mobile communication system, the method comprising:
   transmitting, to the NF, a network exposure subscription request message including a reporting type parameter that instructs the NF to report a data set representing differences from a previous notification;
   receiving the data set determined by the NF based on the reporting type parameter from the NF through an event exposure notification message; and
   reassembling the data in the previous notification with the data set,
   wherein the event exposure notification message is transmitted by the NF according to an event exposure service in the mobile communication system and the data set determined by a comparison with data in the previous notification includes at least one of newly added data, deleted data, or changed data from the previous notification.

2. The method of claim 1, wherein:
   the network exposure request message further includes an event reporting granularity parameter, and
   the data set is determined by the NF based on the event reporting granularity parameter and the reporting type parameter.

3. The method of claim 2, further comprising inferring data corresponding to a next reporting cycle from the data set received in at least one reporting cycle based on the event reporting granularity parameter when the event exposure notification message is not received from the NF in the next reporting cycle after the data set is received from the NF at the at least one reporting cycle.

4. A device for collecting network data from a network function (NF) in a mobile communication system, the device comprising:
   a processor, a memory, and a communication unit,
   wherein the processor coupled to the communication unit executes a program stored in the memory to perform:
   transmitting a network exposure subscription request message including an event reporting granularity parameter to the network function (NF);
   receiving a data set determined by the NF based on the event reporting granularity parameter from the NF through an event exposure notification message; and
   inferring an event from a previous notification with the event reporting granularity parameter by using the data set,
   wherein the event exposure notification message is transmitted by the NF according to an event exposure service in the mobile communication system and the event reporting granularity parameter indicates a change of data that the NF neglects when reporting the data.

5. The device of claim 4, wherein:
   the network exposure request message further includes a reporting type parameter that instructs the NF to report the data set representing differences from a previous notification, and
   when receiving a data set determined by the NF based on the event reporting granularity parameter from the NF through an event exposure notification message, the processor performs:
   receiving, from the NF, the data set including at least one of newly added data, deleted data, or changed data determined by a comparison with data in the previous notification.

6. The device of claim 4, wherein the processor executes the program to further perform:
   inferring data corresponding to a next reporting cycle from the data set received in at least one reporting cycle based on the event reporting granularity parameter when the event exposure notification message is not received from the NF in the next reporting cycle after the data set is received from the NF at the at least one reporting cycle.

7. A network function (network function, NF) in a mobile communication system, comprising:
   a processor, a memory, and a communication unit,
   wherein the processor coupled to the communication unit executes a program stored in the memory to perform:
   receiving, from a collecting device, a network exposure subscription request message including a reporting type parameter that instructs the NF to report a data set representing differences from a previous notification;
   determining the data set based on the reporting type parameter by a comparison with data in the previous notification, wherein the data set includes at least one of newly added data, deleted data, or changed data from the previous notification; and transmitting the data set to the collecting device through an event exposure notification message, wherein the event exposure notification message is transmitted by the NF according to an event exposure service in the mobile communication system and the data set is used by the collecting device to reassemble the data in the previous notification with the data set.

8. The method of claim 7, wherein the network exposure request message further includes an event reporting granularity parameter, and the data set is determined by the NF based on the event reporting granularity parameter and the reporting type parameter.

9. The method of claim 8, wherein the event reporting granularity parameter is applied to one event specific parameter, and the data set includes a plurality of event specific parameters.

10. The method of claim 8, wherein the event reporting granularity parameter is a parameter representing a maximum allowable error for the network data.

11. The method of claim 8, wherein the event reporting granularity parameter indicates a change of data that the NF neglects when collecting the network data.

12. The method of claim 11, wherein the event reporting granularity parameter indicates a range of changes in the network data when the network data to be collected by the NF is represented by numbers.

13. The method of claim 8, wherein the event reporting granularity parameter indicates a previous notification or an identifier list when the network data to be collected by the NF is represented by an identifier.

14. A network function (network function, NF) in a mobile communication system, comprising:

a processor, a memory, and a communication unit, wherein the processor coupled to the communication unit executes a program stored in the memory to perform:

receiving a network exposure subscription request message including an event reporting granularity parameter from a collecting device;

determining a data set based on the event reporting granularity parameter; and transmitting the data set to the collecting device through an event exposure notification message, wherein the event exposure notification message is transmitted by the NF according to an event exposure service in the mobile communication system and the event reporting granularity parameter indicates a change of data that the NF neglects when reporting the data, wherein the data set is used by the collecting device to infer an event from a previous notification with the event reporting granularity parameter by using the data set.

15. The device of claim 14, wherein the event reporting granularity parameter is applied to one event specific parameter and the data set includes a plurality of event specific parameters.

16. The device of claim 14, wherein the event reporting granularity parameter is a parameter indicating a maximum allowable changing for the network data.

17. The device of claim 14, wherein the event reporting granularity parameter includes a previous notification or an identifier list.

18. The device of claim 14, wherein the event reporting granularity parameter includes a range of changes of the network data when the network data to be collected by the NF is represented by numbers.

19. The device of claim 14, wherein:

the network exposure request message further includes a reporting type parameter that instructs the NF to report the data set representing differences from a previous notification, and when determining a data set based on the event reporting granularity parameter, the processor performs determining the data set including at least one of newly added data, deleted data, or changed data through a comparison with data in the previous notification.

* * * * *